United States Patent [19]
Schultz

[11] Patent Number: 5,694,967
[45] Date of Patent: Dec. 9, 1997

[54] MULTI-PORT PROPORTIONAL FLOW CONTROL VALVE

[75] Inventor: Matthew S. Schultz, Sarasota, Fla.

[73] Assignee: Dana Corporation, Toledo, Ohio

[21] Appl. No.: 557,301

[22] Filed: Nov. 14, 1995

[51] Int. Cl.⁶ .................................................. F16K 11/00
[52] U.S. Cl. ................ 137/118.02; 60/739; 137/118.04; 137/625.46; 239/76
[58] Field of Search ............ 60/739; 137/118.02, 137/118.04, 118.07, 625.46; 239/76

[56] References Cited

U.S. PATENT DOCUMENTS

| | | | |
|---|---|---|---|
| 2,653,003 | 9/1953 | Overbeke | 137/625.21 |
| 2,664,910 | 1/1954 | Boyd et al. | 137/118 |
| 2,692,797 | 10/1954 | Wood et al. | 239/76 |
| 2,700,394 | 1/1955 | Jay | 137/118.02 |
| 2,731,976 | 1/1956 | Orent et al. | 137/118.02 |
| 2,762,426 | 9/1956 | Wood et al. | 137/118.02 X |
| 2,782,739 | 2/1957 | Freer | 137/118.02 X |
| 2,786,482 | 3/1957 | Bayer | 137/118.04 |
| 2,821,992 | 2/1958 | Richards et al. | 137/118.02 |
| 2,832,368 | 4/1958 | Freer | 137/118.02 |
| 2,845,079 | 7/1958 | Hutton | 137/118.04 |
| 2,845,939 | 8/1958 | Bayer | 137/118.04 |
| 3,080,885 | 3/1963 | Webster et al. | 239/76 X |
| 3,899,879 | 8/1975 | Downing | 251/208 X |
| 4,164,962 | 8/1979 | Soderberg | 137/862 |
| 4,226,365 | 10/1980 | Norris et al. | 239/66 |
| 4,546,796 | 10/1985 | Bourquin | 137/625.48 |
| 4,590,768 | 5/1986 | Halvorsen et al. | 60/741 |
| 4,614,202 | 9/1986 | Halvorsen et al. | 137/118 |
| 5,003,771 | 4/1991 | Kester et al. | 60/243 |
| 5,412,746 | 5/1995 | Latta | 137/118.02 |

Primary Examiner—Gerald A. Michalsky
Attorney, Agent, or Firm—Millen, White, Zelano & Branigan, P.C.

[57] ABSTRACT

A flow control valve for multiport injection of pressurized liquid through an array of injection nozzles for a gas turbine engine is connected by nozzle ports to the engine. In accordance with a first embodiment, the valve includes a slidable valve spool which progressively opens and closes a plurality of radially opening first ports. In accordance with a second embodiment the valve employs a rotatable disc which progressively opens and closes a plurality of axially opening first ports. Both embodiments utilize non-circular apertures to effect opening of the first ports. A plurality of second ports communicate with a chamber containing the valve spool or rotatable disc, the second ports communicating with individual compensators that are also in communication with the first ports and nozzle ports. The compensators connect the first ports to the nozzle ports through a variable flow valve which is biased to the fully open opposition against the pressure of liquid in the second ports. By so configuring the flow control valve, pressure in the chamber compensates for pressure surges in the pressurized liquid by reducing flow through the variable flow valve in response to pressure increases in the pressurized fluid.

7 Claims, 5 Drawing Sheets

MULTI-PORT PROPORTIONAL FLOW CONTROL VALVE

FIELD OF THE INVENTION

The present invention is directed to multi-port proportional flow control valve for turbine engines. More particularly, the present invention is directed to multi-port flow control valves which modulate the flow of injection liquid in gas turbine engines and distributes the liquid among a multitude of injection nozzles.

BACKGROUND ART

Gas turbine engines are defined as axial flow, rotary machines which utilize an annular combustion chamber. Gas turbines are used for a number of purposes, including powering aircraft, electric generators and pumps for oil and gas lines. Typically, a plurality of nozzles are disposed in the combustion chambers of gas turbines for spraying fuel into a stream of air passing through the chambers. The fuel is ignited and burned with oxygen to add energy to the stream of air.

The fuel system of a gas turbine includes a source of pressurized fuel, an array of fuel injection nozzles and a fuel control valve. The fuel control valve responds to power settings of the engine and adjusts the flow rate of fuel through an array of ports to the nozzles accordingly. The ports in the fuel control valve extend through the casing of the valve and are controlled by a valve spool which progressively either uncovers or covers the ports to increase and decrease the flow of fuel to the engine. Each port in the valve has the same flow area for a given location of the piston so as to distribute fuel in equal amounts to the fuel nozzles in the combustion chamber. This provides uniform combustion within the combustion chamber and avoids the occurrence of localized high temperature regions in the chamber.

Maintaining equality of flow distribution among a multitude of turbine injection nozzles is a constant concern, as is the need to eliminate valve-generated contamination of fuel or other injection liquids (such as water). Since low lubricity injection systems are more likely to encounter problems in flow distribution, equality of flow among of the injection nozzles of such systems is a serious concern.

BRIEF SUMMARY OF THE INVENTION

It is a feature of the present invention to provide a new and improved flow control valve for multiport injection systems useful for distributing pressurized fuel or other liquids, such as water, to combustion chambers of internal combustion engines, such as a gas turbine engines.

Upon further study of the specification and appended claims, further features and advantages of this invention will become apparent to those skilled in the art.

In view of this feature and other features, the present invention is utilized in a flow control valve for multiport injection of pressurized liquid through an array of injection nozzles connected by nozzle ports to the flow control valve. The valve includes a valve spool aligned axially with a common inlet in a chamber having a plurality of radially positioned first radial ports wherein each of the first radial ports is connected to an outlet port which, in turn, is connected to one of the liquid injection nozzles. In accordance with the present invention, the improvement in the aforedescribed flow control valve includes a plurality of shaped inlet openings in the chamber which are aligned with the first radial ports. Also in communication with the chamber are passages through the valve spool, which passages communicate with a space behind the valve spool. A plurality of second radially disposed ports communicate with the space behind the valve spool. The first and second ports are in communication with individual compensators with each of the first ports being connected through the compensators to their respective nozzle ports and with the second ports applying countervailing pressure to variable flow valves within the compensators. By so configuring, the flow control valve, pressure in the space behind the piston compensates for pressure surges in the pressurized liquid by reducing flow through the variable flow valve in response to pressure increases in the pressurized fluid.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
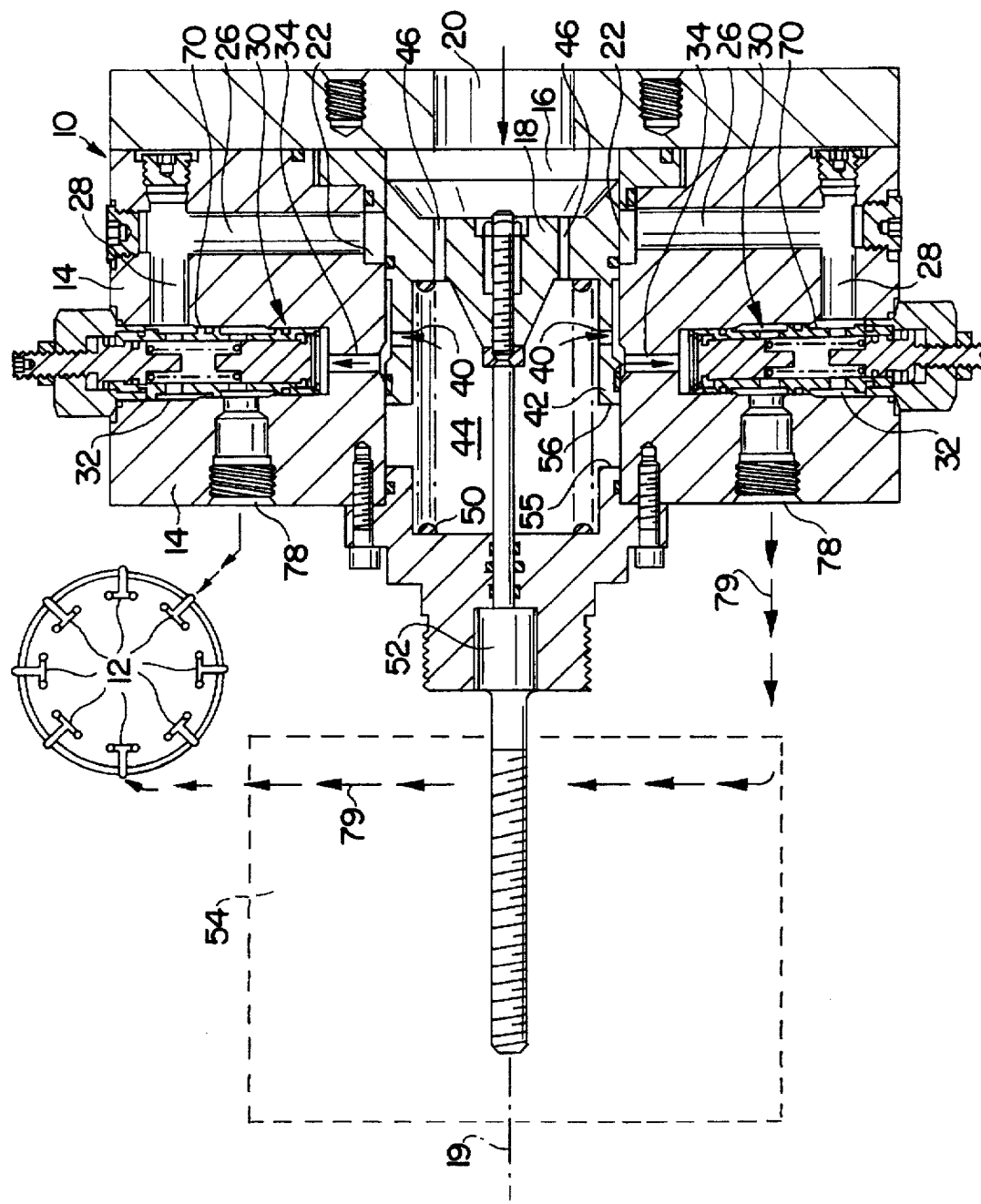
FIG. 1 is a side elevation of a first embodiment of the invention showing a multiport valve connected to a plurality of fuel nozzles with the multiport valve closed by a sliding spool.
Figure 2:
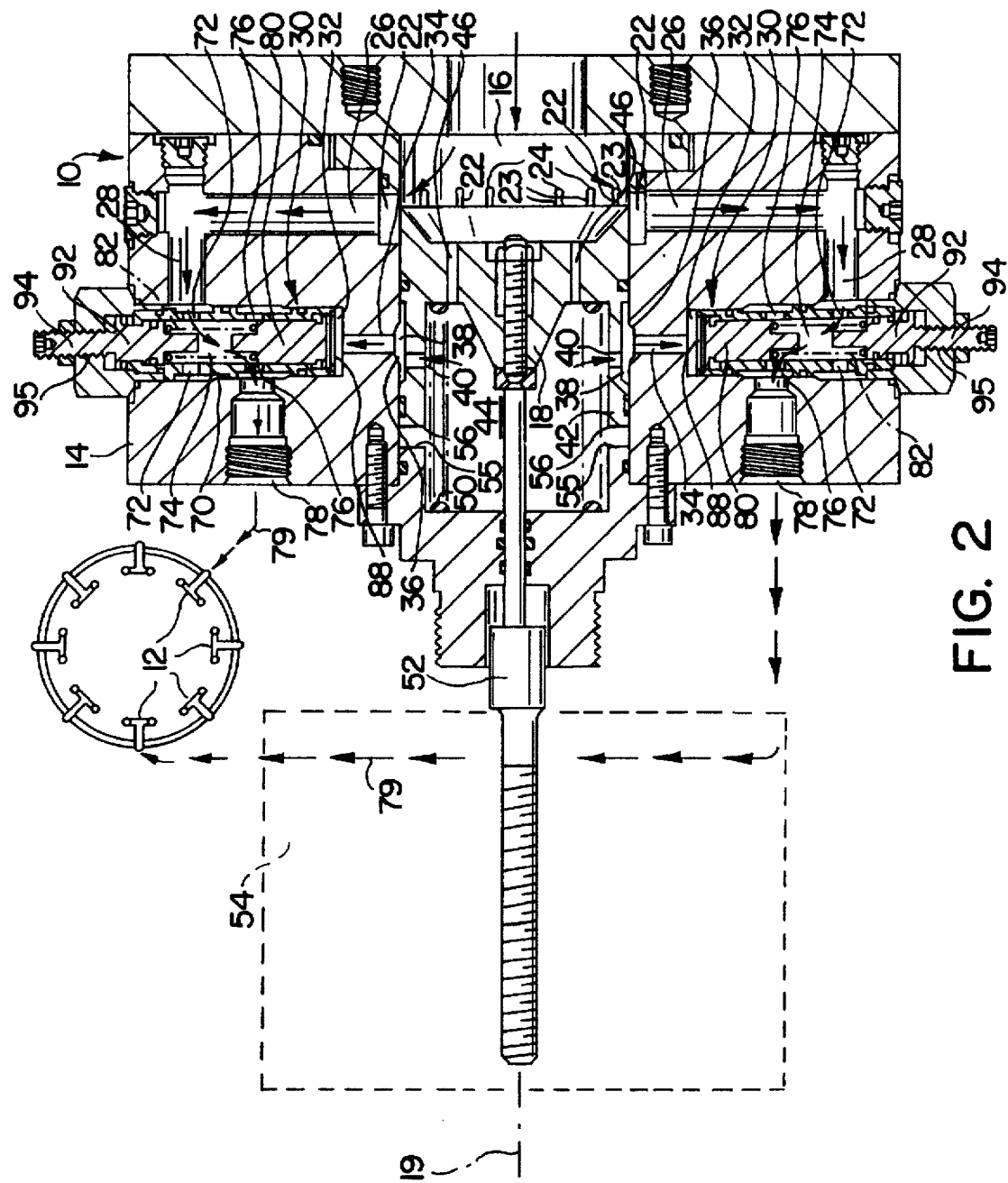
FIG. 2 is a view similar to FIG. 1, but showing the multiport valve partially opened.
Figure 3:
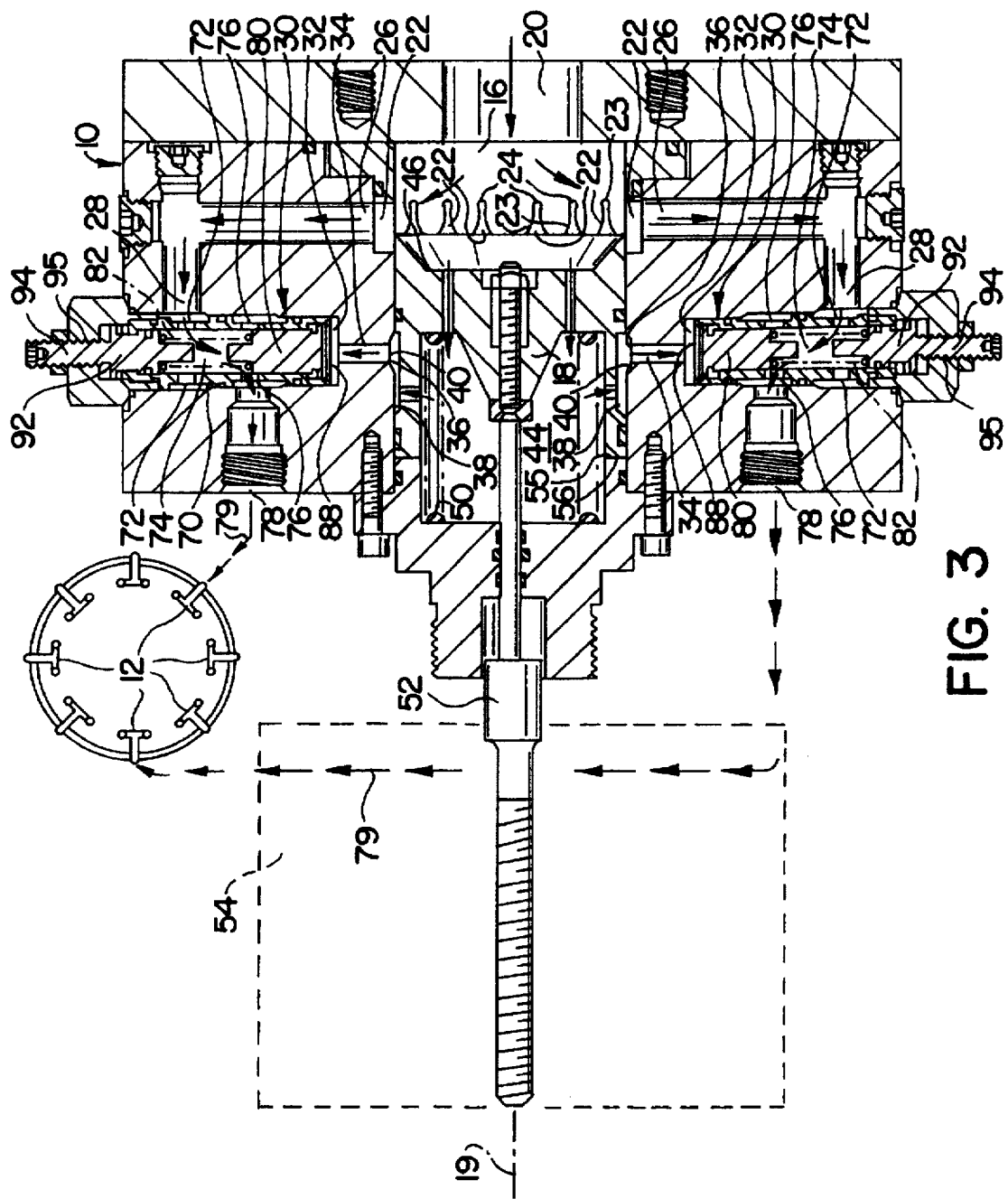
FIG. 3 is a view similar to FIGS. 1 and 2, but showing the multiport valve fully opened.

Referring now to FIGS. 1-3, there is shown a first embodiment of multiport fuel control valve 10 for use with an internal combustion engine (such as a gas turbine engine) having a plurality of fuel dispensing nozzles 12 which dispense fuel to the combustion chamber or chambers of the engine. The multiport valve 10 is comprised of an annular valve block 14 defining a chamber 16 which receives a metering spool 18. The metering spool 18 is axially aligned with a pressurized fluid inlet 20 that is connected to a source of pressurized fuel (not shown). The number of nozzles 12 depends on the engine. In the illustrated embodiment, eight nozzles are shown, but the number could, for example, be ten, fourteen, eighteen or any other reasonable number.

As is seen in FIGS. 2 and 3, arrayed in an annular array about the axis 19 of the chamber 16 are a plurality of identical, shaped, first ports 22, one for each nozzle 12. The shaped first ports 22 each converge in an axial direction toward the pressurized fuel inlet 20 and are defined by opposed convexed surfaces 23 which converge toward an apex 24. Each of the ports 22 communicates with a radially extending passage 26 which in turn communicates with an axially extending passage 28. The axially extending passages 28 each communicate with a compensator valve 30 disposed within a radially oriented chamber 32. There is one compensator 30 valve for each nozzle 12. The radially oriented chambers 32 communicate with second radial passages 34 which are aligned with second radial openings 36. The second radial openings 36 are disposed behind the metering spool 18 and communicate via an annular relief 38 with spool ports 40 annularly disposed in a sleeve portion 42 of the metering spool 18. Behind the metering spool 18, there is a cavity 44 which communicates with the chamber 16 in front of the metering spool 18 via axial spool passages 46. Consequently, pressurized liquid, such as pressurized liquid fuel, in the chamber 16 applies pressure through the metering spool 18 to the cavity 44 and thus to the second radial passages 34. When the metering spool 18 is in the position of FIGS. 2 and 3, the pressurized liquid fuel is also applied via the identical shaped first ports 22 to the radial passages 26, and thus to the axial passages 28. Consequently, pressurized fuel is applied to the compensating valve 30 at two opposed locations.

The flow through each shaped first port 22 is at an identical rate because the uncovered area of each shaped passage is identical and the differential pressure across is shaped passage is identical due to the action of each of the compensators valve 30. Each compensator valve 30 acts as a variable flow restrictor in series with its respective shaped first port 22. The compensators valves 30 each sense pressure upstream of their respective shaped first ports 22 by sensing the pressure in chamber 16 via spool ports 46 and second radial passages 34 and downstream by sensing the pressure in first radial passages 26. As will be explained hereinafter, the compensator valves 30 each continuously adjust the flow therethrough so that a constant differential pressure is maintained across each shaped first port 22.

The valve spool 18 is biased by a coil spring 50 to the position of FIG. 1 and is moved axially from the position of FIG. 1 to the partially open position of FIG. 2 and to the fully open position of FIG. 3 with a spindle 52. The spindle 52 is pulled axially by a stepper-type, linear actuator 54 which pulls the metering spool 18 back against the bias of the spring 50. The linear actuator need not necessarily be a stepper-type device, but may be a hydraulic, manual, ball screw actuator or any other suitable actuator. As is seen in FIG. 3, in its fully open position, the metering spool 18 abuts a stop surface 55 with an annular end face 56.

Returning now more specifically to the structure of the compensator valve 30, it is seen that the compensator valve 30 includes a cylindrical housing 70 having a first set of valve ports 72 connected through a central bore 74 to second valve ports 76. The first valve ports 72 communicate with the axial passage 28 and first radial passage 26 to deliver fuel through the valve bore 74 to the second valve ports 76. The second valve ports 76 are connected to nozzle ports 78 and each nozzle port 78 is connected to a nozzle 12 by a line 79. Accordingly, when the inlets 22 are uncovered by the valve spool 18, pressurized fuel flows through the radial passages 26, axial passages 28, valve bores 74 and out of the second passages 76 for delivery from the nozzle ports 78 to the nozzles 12 in the combustion chamber of the associated gas turbine engine.

In order to modulate the aforedescribed flow of fuel, the compensator valves 30 each include a piston 80 slidable in one of the bores 74 against the bias of one of the springs 82. The bores 74 have open ends 86 which are in communication with second axial passages 34 in the housing 14 so that liquid in the cavity 44 applies pressure to the faces 88 of the pistons 80. This countervailing force to the force of liquid pressurized in the bores 74 and the force of springs 82 tends to cause the cylindrical exterior surfaces 90 of the pistons 80 to restrict the size of the openings defined by the second valve ports 76.

When the metering spool 18 is in the position of FIG. 2 or FIG. 3 so that pressurized fuel is flowing through inlets 22, the compensator valves 30 and out of the nozzle ports 78, countervailing pressure is applied against the face 88 of the piston 80. When there is a variation in pressure such as a pressure surge, the pressure urges the piston 80 against the bias of the spring 82 and tends to restrict the valve ports 76. If the variation in pressure is a drop in pressure, then the spring 88 urges the piston 80 radially inward which tends to widen the valve ports 76 letting more fuel through. Consequently, a rise in pressure, tending to increase the amount of fuel flowing through the valve ports 76, is counteracted by the piston 80, making the opening of the valve port 76 smaller while a drop in pressure tending to decrease the amount of flow through the valve port 76 causes the piston 80 to widen the openings of the valve ports 76. Since each of the pistons 80 is connected via the second radial passages 34 to the cavity 44, each of the compensator valves 30 responds equally to fluctuations and inlet fuel pressure applied through the pressurized fuel inlet 20.

The compressive force exerted by the spring 82 is set by a plunger 92 having a shoulder 93 thereon against which one end of the spring 82 seats. The plunger 92 has a threaded stud 94 extending therefrom which mates with a threaded opening 95 in a retaining nut 96 that holds the compensator valve 30 in position.

Figure 4:
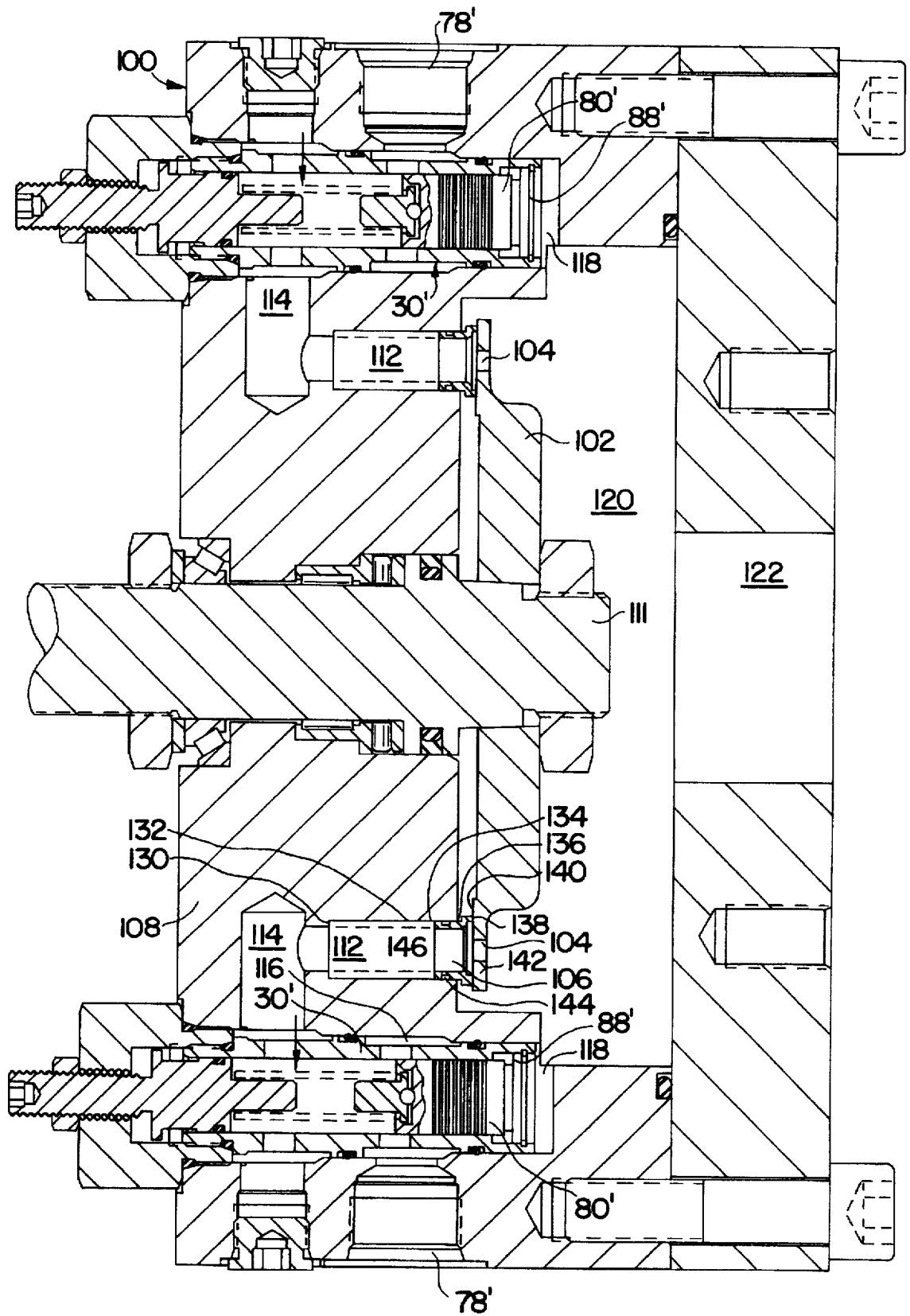
FIG. 4 is a side elevation of a second embodiment of the invention showing a multiport valve connected to a plurality of nozzles, but using a rotatable disc rather than a sliding spool to control liquid flow.
Figure 5:
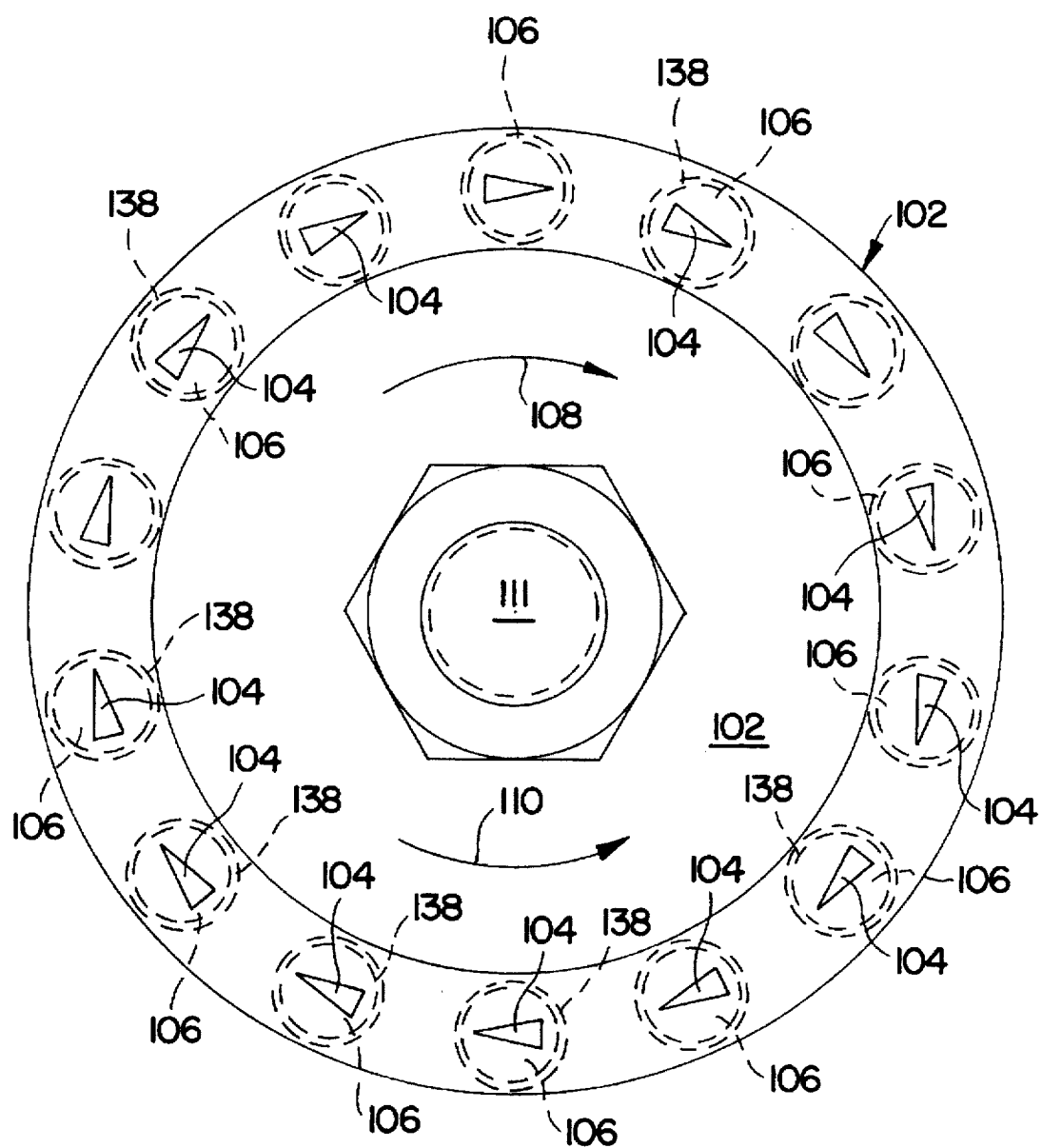
FIG. 5 is a front view of the disc of FIG. 4.

Referring now to FIGS. 4 and 5, a second embodiment of a multiport, fuel control valve 100 is shown. Fuel control valve 100 utilizes a rotatable disc 102 rather than the sliding spool 18 of FIGS. 1–3. The rotatable disc 102 has a plurality of shaped apertures 104 therethrough which are aligned with inlet openings 106 in a first valve body member 108. In the illustrated embodiment, there are fourteen shaped apertures 104 and fourteen inlets 106 for use with a gas turbine engine which has fourteen nozzles. As with the first embodiment of FIGS. 1–3, the second embodiment 100 of the multiport fuel control valve may have either more than or less than fourteen inlets 106 depending on the number of nozzles served. When the disc 102 is rotated in the clockwise direction of arrow 108, the apertures 104 cooperate with the inlet openings 106 to define a larger open area allowing more fuel (or water) to flow into the inlet openings 106. When the disc 102 is rotated in the direction of arrow 110, the apertures 104 narrow the opening of the inlet 106 and less fuel flows therethrough. When the disc 102 is rotated in the direction 110 a sufficient distance to move the apertures 104 are out of alignment with the inlets 106, then the flow of fuel through the inlets ceases. The disc 102 is fixed to a shaft 111 which is driven in a conventional way by an appropriate actuator (not shown) which will slightly rotate the plate through very small angles to finely position the apertures 104 with respect to the inlet openings 106.

The inlets 106 are each aligned with a first axially extending bore 112 which, in turn, is aligned with a radially extending bore 114. The radially extending bores 114 each communicate with compensator valves 30' which are substantially the same as the compensator valves 30 of FIGS. 1–3. In the embodiment of FIG. 4, the nozzle ports 78' open radially, rather than axially, as is the case with the compensator valves 78 of the first embodiment of the multiport fuel control valve 10. The compensator valves 30' are seated within axially disposed chambers 116. Each axially disposed chamber 116 has an end port 118 which communicates with a pressurized valve chamber 120 that, in ram, is connected to a fuel or liquid inlet 122. Consequently, pressurized fuel in the valve chamber 120 is applied through the end ports 118 to the faces 88' of the pistons 80'. The compensator valves 30' of the multiport control valve 100 therefore function in substantially the same as the compensator valves 30 of the multiport control valve 10 to control dispensed fuel through the nozzle ports 78'.

Referring now again to the inlet openings 106, it is seen that each axial passage 112 has a radial shoulder 130 against which is seated a coil spring coil spring 132 each bear against an end 134 of a sleeves 136. The sleeves 136 define the inlet openings 106 and each have an annular end surface 138 which bears against a back surface 140 on a peripheral rim portion 142 of the disc 102. The springs 132 urge the annular end surfaces 138 of the sleeves 136 into metal-to-metal contact with the back surface 140, thereby eliminating or at least minimizing the unintentional and undesirable leakage of fuel past the disc 102. In order to effectively seal the sleeves 136 with respect to the walls of the axial passages 112, each sleeve 136 has an O-ring 144 seated in an annular groove 146, which seals engage the walls.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a flow control valve useful for supplying pressurized liquid to a gas turbine engine, the flow control valve being connected to a multiport injection system through an array of injection nozzles connected by more than two nozzle ports to the flow control valve, the improvement in the flow control valve comprising:

a chamber in the flow control valve for receiving the pressurized fluid from a single inlet port;

a rotatable disc in the chamber for controlling the volume of pressurized liquid flowing to the nozzle ports, the rotatable disc having a non-circular aperture for each nozzle port therein extending circumferentially adjacent the periphery of the disc;

compensator valves disposed between the nozzle ports and controller, the compensator valves each having a through passage and a pressure passage, the pressure passage opposing the through passage;

a moveable member in each of the compensators, the moveable member being disposed between the pressure passage and the through passage of each compensator and being biased toward the pressure passage in a direction to widen the through passage; and passages connecting the through passages and pressure passages to the chamber with the passages connecting the pressure passages being always open and the passage connecting the through passages being openable and closeable by the non-circular apertures in the rotatable disc.

2. The improvement of claim 1, wherein the passages connecting the through passages to the chamber have inlets connected through the non-circular apertures in the rotatable disc which are in communication with the chamber, the inlets being progressively opened and closed by rotating the rotatable disc.

3. The improvement of claim 2, wherein the inlets each have a sleeve therein biased into engagement with the rotatable disc at a location alignable with the non-circular apertures.

4. The improvement of claim 3, wherein the sleeves have first and second ends, the first ends being engaged by a coil springs having one end seated in the inlets and the second ends being in metal-to-metal contact with the disc.

5. The improvement of claim 4, wherein the non-circular openings are triangular.

6. The improvement of claim 1, wherein the non-circular openings are identical and wherein the non-circular openings each converge in the same circumferential direction and each diverge in the opposite circumferential direction.

7. The improvement of claim 1, wherein the moveable member in each of the compensator valves is a piston disposed therein, each piston being biased by a spring and having a portion for covering the through passage when urged by pressure from the pressure passage against the bias of the spring.

* * * * *